United States Patent [19]

Green et al.

[11] Patent Number: 5,168,891
[45] Date of Patent: Dec. 8, 1992

[54] FLOAT VALVE AND UTILIZATION SYSTEM

[75] Inventors: Charles J. Green, Vashon; John M. Morris, Auburn, both of Wash.

[73] Assignee: GT Development Corporation, Tukwila, Wash.

[21] Appl. No.: 831,930

[22] Filed: Feb. 6, 1992

[51] Int. Cl.⁵ .............................................. F02M 37/00
[52] U.S. Cl. .................... 137/114; 137/194; 137/448
[58] Field of Search ............... 137/255, 111, 114, 192, 137/194, 448, 565

[56] References Cited

U.S. PATENT DOCUMENTS

| | | | |
|---|---|---|---|
| 1,246,033 | 11/1917 | Adams | 137/448 X |
| 2,016,867 | 10/1935 | Marden | 137/194 X |
| 2,918,931 | 12/1959 | Siri | 137/448 X |
| 4,678,001 | 7/1987 | Lacey | 137/194 |
| 5,020,566 | 6/1991 | Shoop | 137/192 X |

FOREIGN PATENT DOCUMENTS

1182099  11/1964  Fed. Rep. of Germany ...... 137/448

Primary Examiner—Alan Cohan
Attorney, Agent, or Firm—Delbert J. Barnard

[57] ABSTRACT

A closure member (64) is mounted at the lower end of a draw tube (14) for pivotal movement between an open position (FIG. 4) and a closed position (FIG. 3). The closure member (64) includes a first side part (68) having a lower outer surface (80) which contacts an upwardly facing first valve seat (76) when the closure members (64) is in a closed position. The closure member (64) includes a second side part (70) which extends laterally outwardly from the pivot axis (66). Side part (70) includes an upper outer surface (82) which contacts a second valve seat (78) when the closure member (64) is in a closed position. A first part (88) of a float arm (94) is connected to the second part (70) of the closure member (64). Float arm part (88) extends downwardly from side part (70) to a lower end connection (92). A coil spring (106) is interconnected between the lower end (92) of arm part (88) and the lower end (98) of arm part (96). A buoyant float body (102) is connected to the outer end of arm part (96).

19 Claims, 5 Drawing Sheets

Fig. 5

FLOAT VALVE AND UTILIZATION SYSTEM

TECHNICAL FIELD

This invention relates to fuel storage systems for motor vehicles, e.g. Commercial trucks. More particularly, it relates to the provision of a two-tank fuel storage system in which the tanks are discrete and each includes a draw tube having a valve which automatically modulates fuel flow in response to a drop in the fuel level in the tank. A valve is provided which is especially adapted to modulate fuel flow from a fuel tank out through a draw tube, but is believed to have other utility as well.

BACKGROUND INFORMATION

It is known to provide commercial trucks with two fuel tanks interconnected by a tube. The tube maintains the fuel level substantially equal in both tanks while fuel is being pumped out from one of the tanks. A problem with this type of system is that the tube must be located below the bottoms of the tanks. At this location the tube is susceptible to being damaged by contact with obstacles in its path projecting upwardly from the roadway. Applicants are aware that prior to the present invention others have investigated using a two-tank system in which the crossover tube is eliminated and a draw tube is provided in each tank. Each draw tube is provided with a ball valve which closes in response to the fuel level in its tank dropping to a near empty condition. The lower end of each draw tube turns upwardly to provide an upwardly directed draw tube inlet. A hollow ball is located in a cage at the inlet. When the fuel level is above the inlet the ball is at the top of the cage and the inlet is open. When the fuel level is at or below the inlet, the ball is seated and the inlet is closed. The fuel pump then pumps fuel only out from the second tank. A problem with this system is that the ball sometimes remains seated after fuel is added to the tank.

A principal object of the present invention is to provide a two-tank system in which the tanks are discrete and the connector tube is replaced by a draw tube in each tank, connected to the pump, and each having a valve which modulates flow in response to the fuel level in its tank dropping to a near empty condition. Another object of the invention is to provide a unique float controlled modulating valve for a draw tube for a liquid storage tank.

DISCLOSURE OF THE INVENTION

The valve of the present invention is basically characterized by a pivotal valve closure member that is mountable onto the lower end of a draw tube. The valve closure member includes a first side part which projects laterally from a transverse pivot axis towards a first valve seat on one side of the draw tube, and a second side part which projects laterally from the pivot axis, in the opposite direction, towards a second valve seat. A float arm is connected to the second side part of the valve closure member. The float arm extends downwardly and then laterally and upwardly to a buoyant float body. The buoyant float body moves up and down in response to up and down movement of the liquid level in the liquid storage tank. As the buoyant float body moves up and down, the float arm moves the valve closure member between open and closed positions.

In preferred form, the float arm includes a first arm part which extends generally downwardly from the second side part of the valve closure member to a lower end, and a second arm part. The second arm part includes a lower end adjacent the lower end of the first arm part. The second arm part extends from its lower end to the buoyant float body. A yieldable connector is provided to connect together the lower ends of the two arm parts, and allow a wagging movement of the second arm part and the float relative to the first arm part. In preferred form, the yieldable connector is a coil spring. A first end portion of the spring is connected to the lower end of the first arm part. A second end portion of the spring is connected to the lower end of the second arm part. Preferably also, an axial space exists between the lower ends of the two arm parts and the spring includes a central portion which bridges the axial space. The lower ends of the two arm parts may be threaded and the end portions of the coil spring may be connected to such lower ends by screwing it onto the threads.

The two part construction of the float arm, with the arm parts being connected together by a yieldable connector, isolates the closure member from severe forces which may be imposed on the float. For example, in a fuel tank installation, the float may be struck by a relatively high velocity stream of fuel being added to the tank, through a delivery nozzle. The yieldable connector will allow the float to move in response to the fuel stream force, without it imposing a force on the closure member of a magnitude which the closure member is incapable of withstanding. Also, the yieldable connector can facilitate installation of the draw tube assembly into a tank through a small diameter hole. In preferred form, the buoyant float body is cylindrical in shape and has a diameter which is substantially equal to the diameter of the draw tube and slightly smaller than the diameter of an opening in the tank top through which the draw tube assembly must pass, when it is being moved into or out from the tank. The buoyant float body is inserted through the opening in a substantially straight line motion. Then, the draw tube assembly is rotated to align the draw tube with the opening in the top of the tank. Then, the draw tube is moved inwardly in a straight line motion until its upper end is in a position for connection to the top of the tank.

Another aspect of the invention is to provide a fuel system for a vehicle which includes a first discrete fuel storage tank and a second discrete fuel storage tank. Each tank includes a top and a bottom and a draw tube which extends downwardly from the top towards the bottom. Each draw tube has a lower end which is positioned adjacent but spaced from the bottom of the tank. A pump is connected to the upper end of the draw tubes, for pumping fuel out from the tanks. Each draw tube is provided with a liquid level responsive valve of the type described. Liquid fuel in the tanks, acting on the buoyant float bodies, raises the buoyant float bodies and in the process swings the float arm and the closure member, to move the closure member into an open position. A lowering of the fuel level in a tank below a predetermined level will cause the buoyant float body to drop in the tank, and in the process swing the float arm and the closure member, to move the closure member into a closed position. In use, the pump will pump fuel out from both tanks until the fuel level in one of the tanks has reached the predetermined level. At that time the closure member in that tank will be moved into a closed position and the pump will then pump fuel only out from the other tank.

Other features, advantages, and objectives of the inventions are hereinafter disclosed in the description of the best mode of the invention.

BRIEF DESCRIPTION OF THE DRAWINGS

Like reference numerals are used to designate like parts throughout the several views of the drawings, and.

BEST MODE FOR CARRYING OUT THE INVENTION

Figure 1:
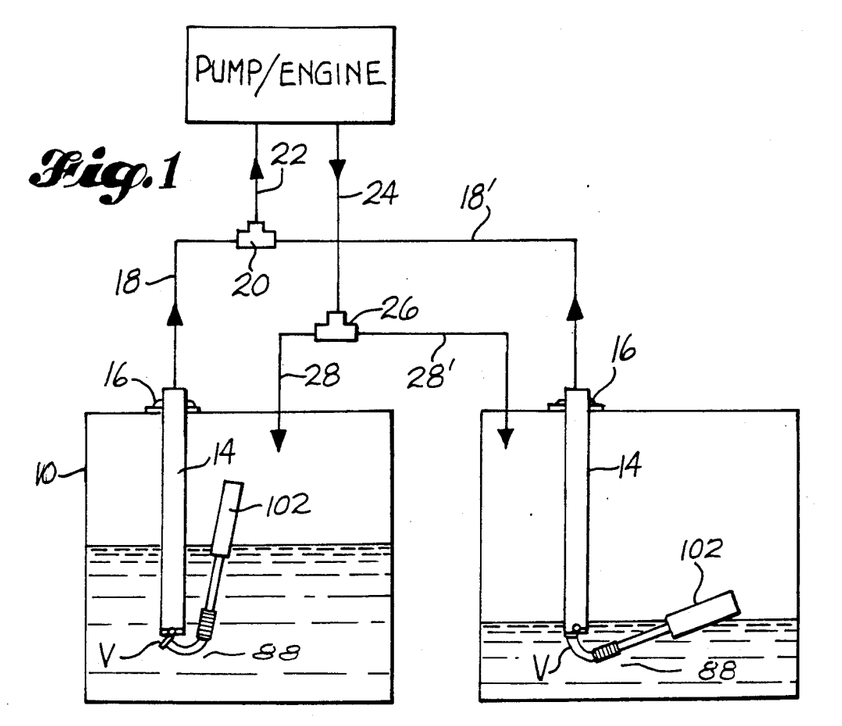
FIG. 1 is a schematic view of a two-tank fuel storage system which includes the present invention, such view showing fuel being pumped from only one of the tanks.

The invention will be described in conjunction with a two-tank storage system for fuel aboard a commercial truck or other motor vehicle. Referring first to FIG. 1, the system includes two fuel storage tanks 10, 12 and a single pump P. Each tank includes a draw tube 14 which extends through a fitting 16 which is affixed to the tank top. The upper ends of the draw tubes 14 are connected to conduits 18 which meet at a tee connection 20 which connects the conduits 18 to a pump inlet line 22. A return line 24 extends from the engine to a tee 26. Tee 26 connects return line 24 with return lines 28, 28'. The lower end of each draw tube 14 is either open or closed by a liquid level responsive valve V. As will hereinafter be described, each valve V includes a valve closure member which is connected to a buoyant float body, sometimes herein referred to as merely a "float".

When the liquid level in either tank 10, 12 is above a predetermined level, the buoyancy force acting on the float F raises the float F and opens the valve. When the liquid level drops below the predetermined level, the float F drops in position in the tank and moves the valve closure member into a closed position.

In operation, when the fuel level in both tanks 10, 12 is above the predetermined level, and both valves V are opened, the pump P pumps fuel from both tanks 10, 12. The same amount of fuel will not be pumped out from both tanks 10, 12. This is because the conduits 18, 18' possess different flow influencing characteristics, e.g. length. Eventually, the fuel level in one of the tanks 10, 12 will drop to the predetermined level while the fuel level in the other tank 10, 12 is still above the predetermined level. This situation is illustrated in FIG. 1. The fuel level in tank 12 has dropped down to the predetermined level and the float F has dropped to a position in which the valve V for tank 12 is closed. The liquid level in tank 10 is still above the predetermined level and the valve V in tank 10 is open. Pump P will continue to draw a suction in line 18' and in the draw tube 34 for tank 12. Because valve V in tank 10 is open, pump P will continue to pump fuel out from tank 10 until either the fuel level in tank 10 drops down to the predetermined level, or additional fuel is added to the tanks 10, 12.

The draw tube 14 and the closure valve V are identical for both tanks 10, 12. Referring to FIGS. 2-8, in preferred form, the draw tube 14 is a straight section of tubing or pipe. It may be constructed from metal or plastic but is preferably constructed from steel. Fitting 16 includes a tubular body 30 and a radial flange 32. Tubular body 30 fits into a circular opening 34 that is punched or otherwise formed in the top wall 36 of tank 10, 12. Flange 32 sets down onto top 36 and is welded to the top 36, at 38. Tube 14 extends through a central circular opening 40 in a mounting fitting 42. Mounting fitting 42 includes a tubular lower end 44 which is externally threaded and which mates with internal threads provided within tubular body 30. Draw tube 14 has a flared upper end. Fitting 42 includes an internally threaded upper portion above the flared end. One leg of an elbow fitting is screwed into the threads and screwed down into clamping contact with the flare. The draw tube 14 is held in a substantially vertical position within the tank 10, by the support provided to it by fittings 42 and 16.

Figures 3, 4:
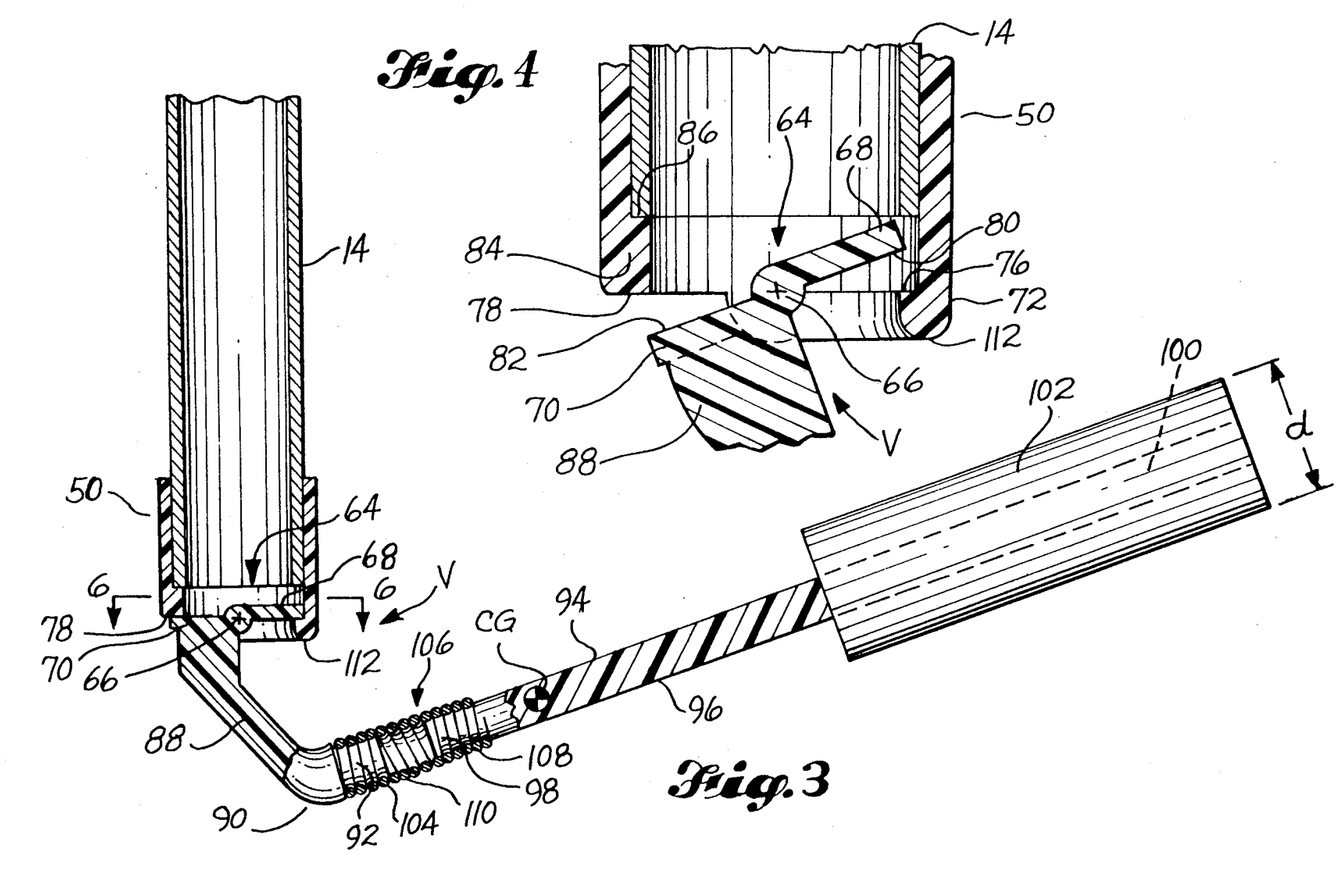
FIG. 3 is an enlarged scale fragmentary view of the lower portion of the draw tube, and the float controlled valve, such view being partially in section and partially in elevation.
FIG. 4 is a fragmentary sectional view on yet a larger scale, in the vicinity of the valve, showing such valve in a slightly open position.
Figure 5:
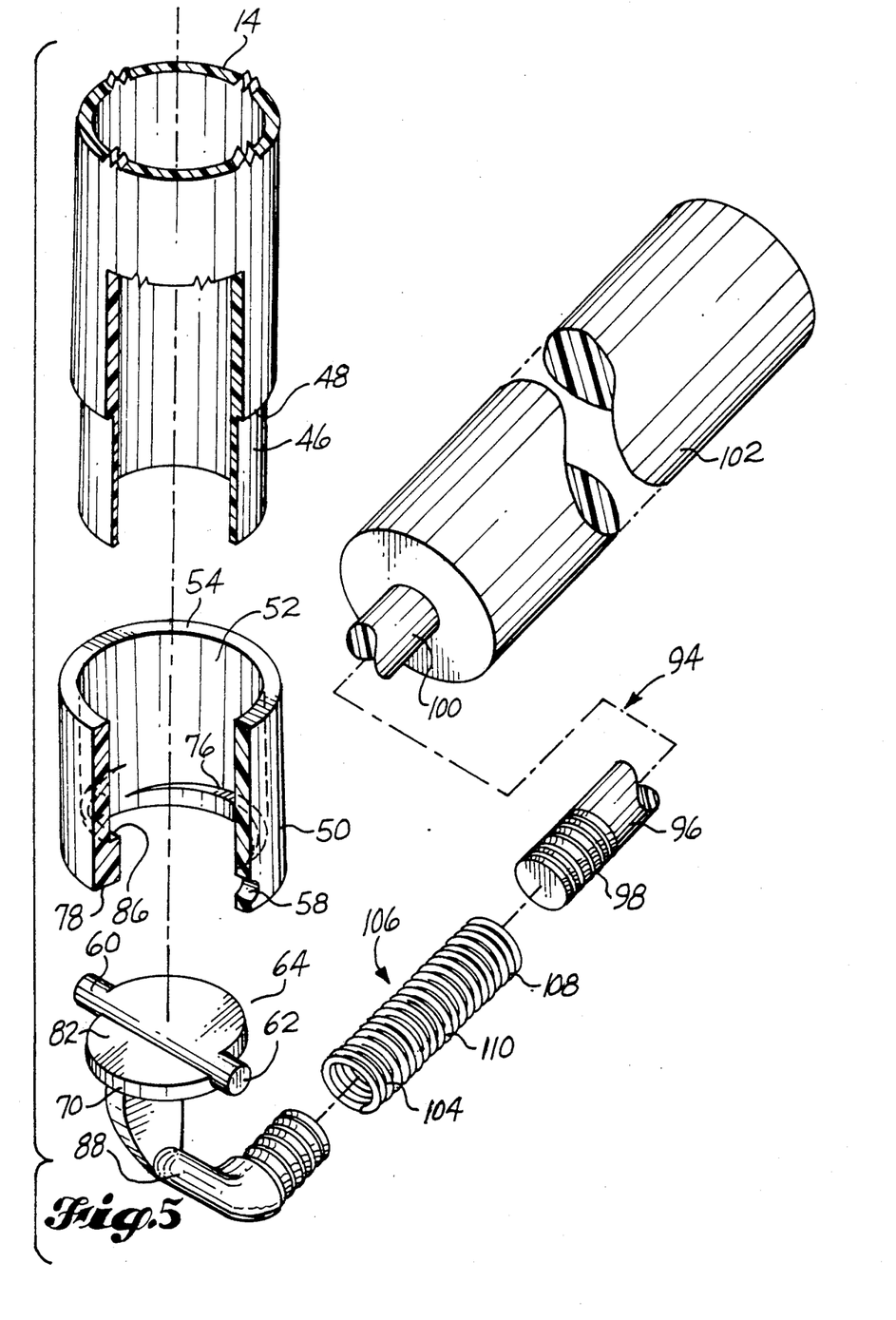
FIG. 5 is an exploded pictorial view of the lower portion of the draw tube, and the float controlled valve, with some parts in section, and with other parts being cut away between their ends.

As best shown by FIGS. 3 and 5, draw tube 14 preferably has a reduced diameter lower end portion 46. A shoulder 48 is formed where portion 46 joins the larger diameter section of draw tube 14 above it. The closure valve V includes a tubular mounting member 50 having an upper portion 52 with an internal diameter substantially equal to the external diameter of draw tube portion 46. Tubular member 50 is press fitted onto the end portion 46 of draw tube 14. Member 50 is moved upwardly until its end surface 56 contacts shoulder 58.

Figures 6, 7, 8:
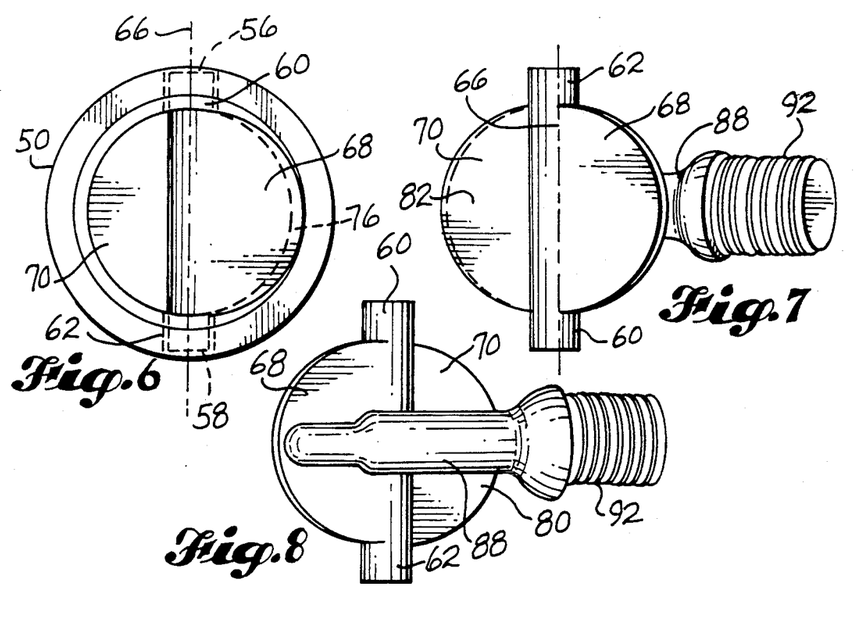
FIG. 6 is a sectional view taken substantially along line 6—6 of FIG. 3.
FIG. 7 is a top plan view of a member which includes a pivotal valve closure member and an arm which is a part of a float arm.
FIG. 8 is a bottom plan view of the member shown by FIG. 7.
Figure 9:
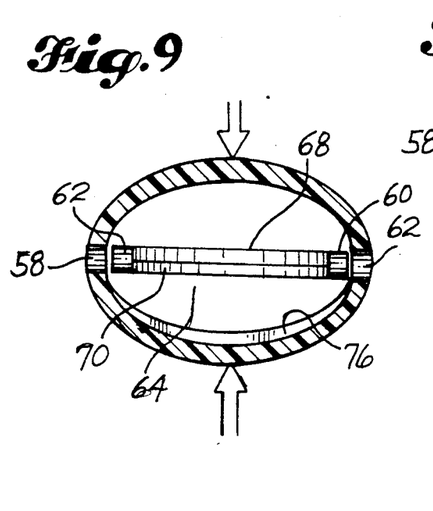
FIG. 9 is a sectional view taken substantially along line 6—6 of FIG. 3 but showing the closure member in an axial plane and the tube being squeezed into an oblong shape to allow insertion of the closure member into the tube.

Tubular member 50 is preferably constructed from plastic. The lower end of tubular member 50 includes a pair of diametrically opposed radial openings 56, 58 (FIG. 6). These openings 56, 58 receive trunnions 60, 62 which extend radially outwardly from a disc shaped closure member 64, at diametrically opposed locations. The bushings 56, 58 and the trunnions 60, 62 serve to pivotally mount the closure member 64 for pivotal movement relative to tubular member 50 and draw tube 14, about a transverse pivot axis 66 (FIGS. 6-8). As shown by FIG. 9, member 50 is squeezed into an oblong shape. Closure member 50 is positioned to be in an axial plane and is then moved upwardly into member 50 until trunnions 60, 62 are aligned with the openings 56, 58. Then the pressure is released to allow the trunnions 60, 62 to enter the openings.

As best shown by FIG. 4, valve closure member 64 includes first and second side parts 68, 70. Side part 68 projects laterally from pivot axis 66 towards sidewall portion 72 of member 50. Sidewall portion 72 includes a radially inwardly projecting lip which defines a radial first valve seat 76 which is directed upwardly and is in substantially the transverse plane as the pivot axis 66. On the opposite side of pivot 66, tubular member 50 includes an end surface 76 which is directed downwardly and defines a second valve seat. Valve seat 78 is substantially in the same transverse plane as pivot axis 66 and valve seat 76. Side part 68 of the closure member 64 includes a lower outer surface 80 which contacts valve seat 76 when the valve V is closed. Side part 70 of valve closure member 64 includes an upper outer surface 82 which contacts valve seat 78 when valve V is closed. The lower end of member 50 opposite lip 74 includes a lip 84 which provides a radial shoulder surface 86. Surface 86 contacts the end surface of draw tube end portion 46 when the tubular member 50 is positioned on draw tube end portion 46. As shown by FIG. 4, when valve closure member 64 is pivoted about pivot axis 66, in the clockwise direction (as illustrated), surface 80 on side part 68 is moved away from valve seat 76 and surface 82 on valve part 70 is moved away from valve seat 78. In preferred form, the valve closure member 64 is movable into a position in which side parts 68, 70 are substantially vertically oriented. In this position the inlet into the draw tube 14 is in a fully open position. As also apparent from FIG. 4, when valve closure member 64 is pivoted about axis 66 in the clockwise direction (as illustrated), surface 80 on part 68 is moved into contact with valve seat 76. Also, surface 82 on valve part 70 is moved into contact with valve seat 76. In this position, there is a substantial closure of the draw tube inlet.

As shown by FIGS. 1–5, 7 and 8, closure member 64 is a part of a member which also includes an arm 88. Arm 88 has an upper end that is connected to a central portion of part 82. The upper end and the connection extend substantially perpendicular to the pivot axis 66, as best shown in FIG. 8. In preferred form, arm 88 extends downwardly and then laterally from its connection to part 82, to a location 90 that is positioned substantially vertically below tube side portions 72. Arm 88 then extends sideways and upwardly, to define a lower end portion 92. This entire member, extending from closure member 64 down to end portion 92, may be a single molded plastic member.

Arm 88 and its end portion 92 are part of a float arm 94. Float arm 94 also includes a straight section 96 having a lower end 98 and an upper end portion 100 that extends longitudinally through the central portion of an elongated buoyant float body 102. End portion 92 of arm section 88 and end portion 98 of arm section 96 arm preferably externally threaded. A first end portion 104 of a coil spring 106 is threaded onto end portion 92. End portion 98 is threaded into a second end portion 108 of the spring 106. Preferably, the ends of arm parts 88, 96 are axially spaced apart and a central portion 110 of spring 106 bridges the gap. Spring 106 provides a flexible coupling between arm sections 88, 96. The gap leaves the central portion 110 of spring 106 unsupported and increases the flexibility of the coupling.

Float body 102 is purposely long and narrow and has a circular cross section (FIG. 6). It has a float body a diameter d small enough to allow it to be passed through the opening 40 in fitting 42. Tubular member 50 also has an external diameter which will allow it to fit through the opening 40. Member 88 is connected to member 50 by an insertion of trunnions 60, 62 into the bushing openings 56, 58. Spring 106 is connected at end 104 to end portion 92 of member 88, and is connected at end portion 108 to end portion 92 of arm section 96. The tubular member 50 is then inserted onto and secured to the lower end portion 46 of draw tube 14. Next, the buoyant float body 108 is moved endwise through opening 40. Movement continues along a generally straight path until the base of member 88 is near the opening 40. Then, the assembly is rotated to plane tubular member 50 in alignment with opening 40. Owing to its construction and dimensions, the arm portion 88 permits this rotational maneuver. When tubular member 50 is in alignment with opening 40, the member 50, and then the draw tube 14, are moved into the tank 10, through the opening 40. This is also a straight line maneuver. When draw tube 14 is in its predetermined position within tank 10, the fitting 42 is manipulated to secure draw tube 14 in place, and securely connect it to the top wall 36 of the fuel tank 10.

Figure 2:
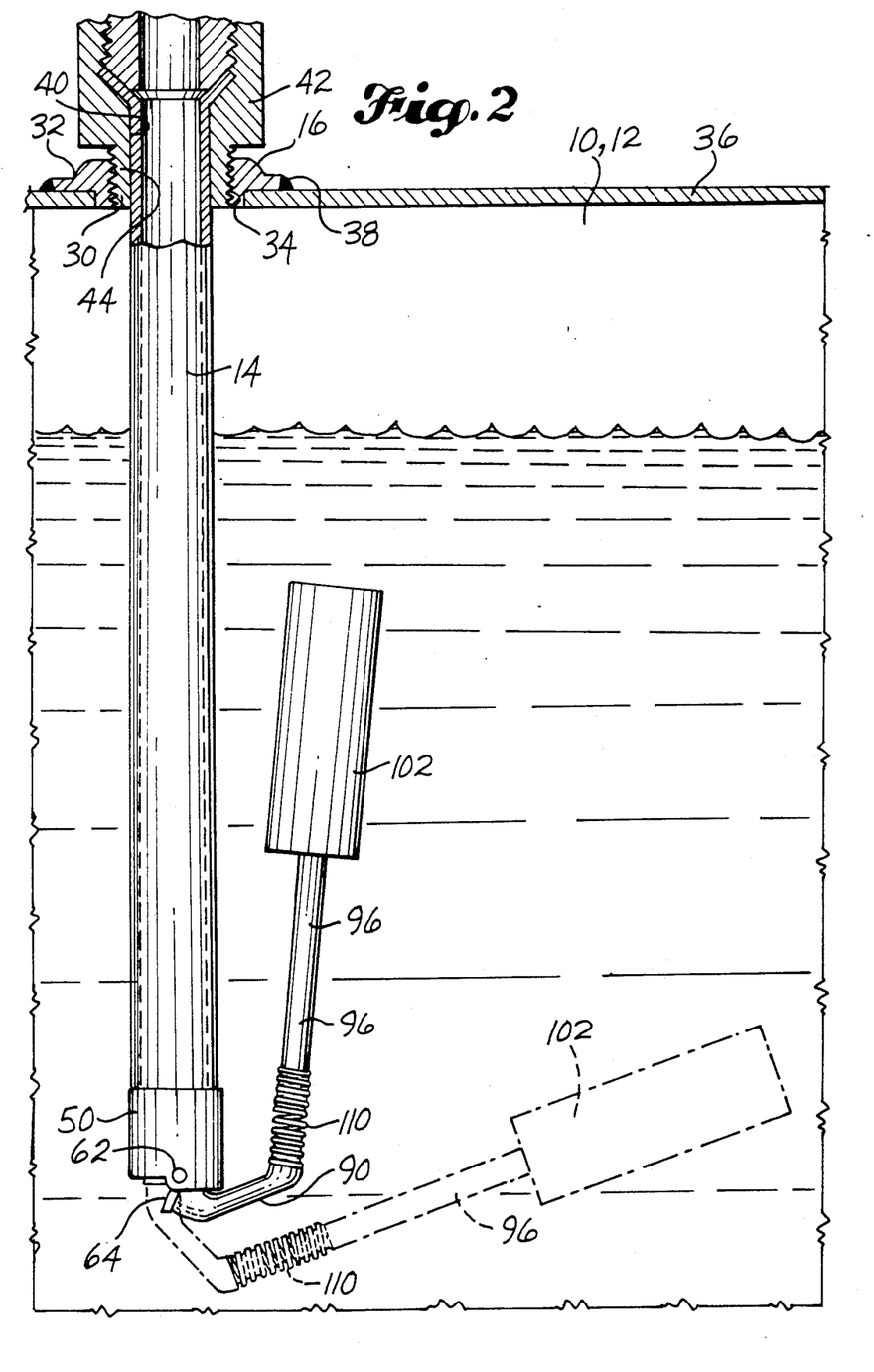
FIG. 2 is an elevational view of a draw tube assembly constructed in accordance with the present invention, such view including a solid line showing of the float controlled valve in an open position, and a broken line showing of the valve in a closed position.

As shown by FIG. 3, the center of gravity of the assembly 64, 88, 106, 96, 102 is located laterally outwardly from the pivot axis 66. Thus, when the float body 102 is not immersed in fuel, the static weight of the assembly will rotate the closure member 64 into a seated position (FIG. 3). As fuel is added to tank 10, and the fuel level moves upwardly in the tank, above the static position of buoyant float body 102, a buoyancy force is created which acts on the buoyant float body 102, forcing it upwardly in the body of fuel. The buoyant float body 102 must travel an accurate path because it is connected to the arm structure 88, 106, 96. The buoyant float body 102, and the arm structure 86, 106, 96 swing upwardly in position, about the pivot axis 66, until arm portion 88 contacts end surface 112 and tubular member 50 (FIGS. 2 and 3). The buoyancy-force movement of the buoyant float body 106, and the arm assembly 88, 106, 96, causes a movement of valve closure member 64 from its closed position into its open position (FIG. 3).

The yieldable connection 106 performs a very important function. Liquid fuel is introduced into the fuel tank through a nozzle. Thus, the fuel enters the tank as a relatively high velocity liquid stream. This stream may strike the buoyant float body 102, imparting to it a force of a relatively large magnitude. The presence of the yieldable connection 106 prevents a substantial portion of this force from being transferred to the side parts 68, 70 of the closure member 64. Yieldable connection 106 may provide a second function in some installations. As described above, the draw tube assembly is designed to be inserted into the tank through a relatively small opening 40 in fitting 42. The buoyant float body 102 is inserted first and arm 96 is moved inwardly until portions 90 and 88 are at the opening 40. The yieldable connection 106 may facilitate the change of direction required in order to align draw tube 14 with the opening 40.

Figure 10:
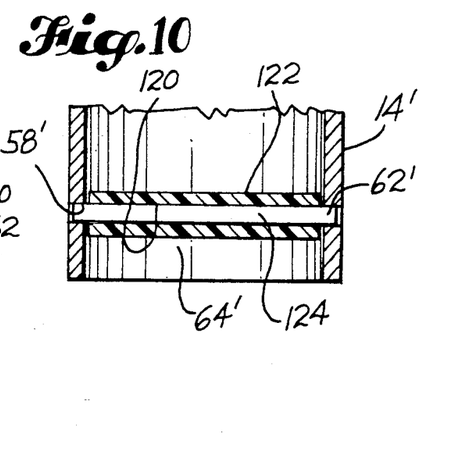
FIG. 10 is a fragmentary axial sectional view showing an alternate way of securing the closure member within the lower portion of the draw tube.

Referring to FIG. 10, there is shown a lower portion of a modified draw tube 14'. This draw tube 14' includes a pair of diametrically opposed pin openings 58', 62'.

Closure member 64' is like closure member 64 except that it is minus the trunnions and includes a transverse bore 120 which extends axially of the generally cylindrical central portion 122 of closure member 64'. A steel pivot pin 124 extends through the bore 120 and at its end extends through openings 58', 62' to pivotally mount closure member 64' onto the draw tube 14'.

Figure 11:
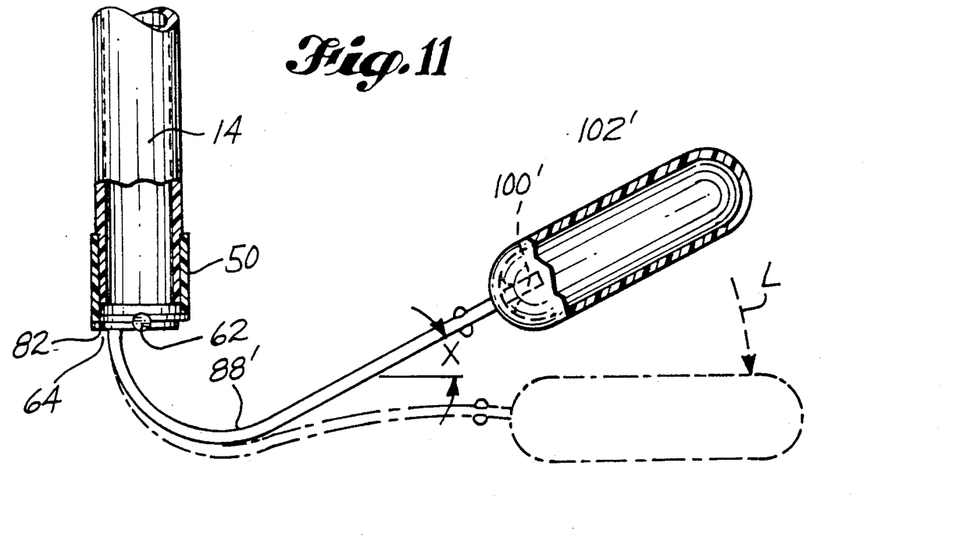
FIG. 11 is a fragmentary elevational view of a modified form of float controlled valve, including a solid line showing of the float and arm in a static position and a broken line showing of the float and arm in a loaded position.

FIG. 11 shows a modified construction of the float controlled valve. The closure member 64 is essentially like the closure member 64 shown in FIGS. 3 and 4, and described above. The float arm 88' is constructed in one piece from a solid rod of plastic. FIG. 11 includes a solid line showing of the static position of arm 88'. It extends vertically downwardly from a location of connection to the part 82 and then curves sideways and then upwardly at an angle X which may be between 15-35 degrees. A hollow float body 102' is secured to the end of arm 88' opposite valve member 64. Arm 88' and valve member 64 may be cast as one piece. Float body 102' may then be secured to end portion 100' of arm 88'. For example, float body 102' may be cast onto end portion 100'. FIG. 11 includes a broken line showing of the float arm 88' under a loaded condition. As described above in connection with the first embodiment, the load L may be applied by a stream of fuel or other liquid being introduced into the tank. As in the first embodiment, the mounting base 50 and the float body 102' are preferably constructed to be of a size that will permit them to be inserted through the opening 44 in fitting 16. The plastic material used for arm 80' is stiff enough to cause the arm and float assembly 88', 102' to assume a fixed static position. However, the material is flexible enough that the arm 88' will bend and not break in response to a load L being imposed upon it, such as by a stream of liquid being introduced into the tank.

The illustrated embodiment is presented as an example construction and use of the invention. The scope of coverage is not to be limited by the illustrated embodiment, but only by the claims which follow, interpreted in accordance with established rules of patent claim interpretation, including use of the doctrine of equivalents.

What is claimed is:

1. A float controlled valve, connectable to the lower end of a draw tube through which liquid is pumped out from a liquid storage tank, comprising:

a tubular mounting member having an upper end portion which is connectable to the lower end portion of the draw tube, and a lower end portion which includes a radially inwardly directed lip on one side of the tubular member, presenting an axially upwardly directed first valve seat, and a radial end surface on a diametrically opposite side of the tubular member, presenting an axially downwardly directed second valve seat which is substantially coplanar with the first valve seat;

a valve closure member mounted on the lower end of the tubular member for pivotal movement about a transverse pivot axis between an open position and a closed position, said closure member having a first side part which projects laterally from the pivot axis towards the tubular member above the first valve seat, and a second side part which projects laterally from the pivot axis in an opposite direction, said first side part having a lower outer surface that is in contact with the first valve seat when the closure member is in a closed position, and said second side part having an outer upper surface which is in contact with the second valve seat when the closure member is in a closed position;

a float arm having a first end and a second end, said first end being connected to the second side part of the closure member, and said float arm extending from said second side part downwardly and then laterally to the second end of said float arm, at a location on the side of the draw tube opposite the second valve seat; and a buoyant float body connected to the second end of the float arm.

2. A float controlled valve according to claim 1, wherein said float arm includes a first arm part which extends generally downwardly from the second side part of the valve closure member to a lower end, and a second arm part which includes a lower end adjacent the lower end of the first arm part, said second arm part extending from its lower end to the buoyant float body, and a yieldable connector connecting together the lower ends of the two arm parts, and allowing a wagging movement of the second arm part and the float relative to the first arm part.

3. A float controlled valve according to claim 2, wherein the yieldable connector is a coil spring having a first end portion connected to the lower end of the first arm part and a second end portion connected to the lower end of the second arm part.

4. A float controlled valve according to claim 3, wherein an axial space exists between the lower ends of the two arm parts, and said spring includes a central portion which bridges said axial space.

5. A float controlled valve according to claim 1, wherein said tubular member includes a radial inner shoulder above the second valve seat, for contacting an end surface of the draw tube.

6. A float controlled valve according to claim 1, for use on a draw tube which has a reduced diameter lower end portion and a radial shoulder at the upper end of said reduced diameter portion, said tubular member being sized to snugly receive the reduced diameter portion of the draw tube, and including an upper end surface adapted to engage the shoulder on the draw tube when the tubular member is installed on the draw tube.

7. A float controlled valve according to claim 1, wherein the valve closure member includes a pair of trunnions which are collinear with the pivot axis, said trunnions extending radially outwardly from diametrically opposite sides of the valve closure member, and wherein said tubular member includes bushings in which the trunnions are received.

8. A float controlled valve according to claim 8, wherein the bushings are cylindrical openings formed in sidewall portions of the tubular member.

9. A float controlled valve according to claim 7, wherein the bushings and the trunnions are constructed from structural plastic.

10. A draw tube assembly, comprising:

an elongated draw tube having an upper end and a lower end, a closure member mounted on the lower end of the draw tube, for pivotal movement about a transverse pivot axis, between an open position and a closed position, said closure member having a first side part which projects laterally from the pivot axis towards first valve seat, and a second side part which projects laterally from the pivot axis, in an opposite direction, towards a second valve seat, said first valve seat facing upwardly and said first side part of the valve closure member having a lower outer surface which is in contact with the first valve seat when the closure member is in a closed position, and said second valve seat facing downwardly, and said second side part of the valve closure member having an upper surface which is in contact with the second valve seat when the closure member is in a closed position;

a float arm having a first end and a second end, said first end being connected to the second side portion of the closure member, and said float arm extending from said second side part downwardly and then laterally to said second end, said second end being positioned on the side of the draw tube opposite the second valve seat; and a buoyant float body connected to the second end of the float arm.

11. A draw tube assembly according to claim 10, wherein the buoyant float body has a cross-sectional dimension substantially equal to the cross-sectional dimension of the draw tube.

12. A draw tube assembly according to claim 11, wherein said float arm includes a first arm part which extends generally downwardly from the second side part of the valve closure member to a lower end, a second arm part which includes a lower end adjacent the lower end of the first arm part, said second arm part extending from its lower end to the buoyant float body, and a yieldable connector connecting together the lower ends of the two arm parts, and allowing a wagging movement of the second arm part and the float relative to the first arm part.

13. A draw tube assembly according to claim 12, wherein the yieldable connector is a coil spring having a first end portion connected to the lower end o the first arm part and a second end portion connected to the lower end of the second arm pat.

14. A draw tube assembly according to claim 12, wherein an axial space exists between the lower ends of the two arm parts, and said spring includes a central portion which bridges the axial space.

15. A draw tube assembly according to claim 14, wherein the lower ends of the two arm parts are threaded and the spring includes end portions which are screwed onto the threaded lower ends of the two arm parts.

16. A fuel system for a vehicle, comprising:
a fist discrete fuel storage tank having a bottom;
a second discrete fuel storage tank having a bottom;
a first draw tube in said first tank;
a second draw tube in said second tank;
each said draw tube having an upper end and a lower end, said lower end being positioned adjacent the bottom of its tank, and each said lower end including an inlet for fuel spaced above the bottom of the tank;
a pump connected to the upper ends of said draw tubes, for pumping fuel up through the daw tubes and out from the tanks; and
a separate flow modulating valve associated with each draw tube, for modulating fuel flow through the draw tube in response and in proportion to a drop in the fuel level int the tank, each said valve comprising a valve closure member mounted on the lower end of the associated draw tube, for pivotal movement about a transverse pivot axis between an open position and a closed position;
a float arm having a first end connected to the closure member, and a second end, said float arm extending from the closure member, laterally from the draw tube; and
a buoyant float body connected to the second end of the float arm, laterally outwardly from the draw tube,
wherein liquid fuel acting on the buoyant float body will raise the buoyant float body, and in the process will swing the float arm and the closure member, moving the closure member towards an open position, and a lowering of the fuel level in the tank to a predetermined level will cause the buoyant float body to drop in the tank, and in the process will swing the float arm and the closure member, to move the enclosure member towards a draw tube closing position, and
wherein during use of the system the pump will pump fuel at a higher rate out from the tank in which the fuel level is higher because the modulating valve for such tank will be open a larger amount than the modulating valve for the other tank, and this will continue until the fuel level in the two tanks has become substantially equal.

17. A fuel system for a vehicle, comprising:
a first discrete fuel storage tank having a bottom;
a second discrete fuel storage tank having a bottom;
a first draw tube in said first tank;
a second draw tube in said second tank;
each said draw tube having an upper end and a lower end, said lower end being positioned adjacent the bottom of its tank, and each said lower end including an inlet for fuel spaced above the bottom of the tank;
a pump connected to the upper ends of said draw tubes, for pumping fuel through the draw tubes and out from the tanks; and
a valve associated with each draw tube, for modulating fuel flow through draw tube in response to a drop in the fuel level in that tank, each said valve comprising a valve closure member mounted on the lower end of the associated draw tube, for pivotal movement about a transverse pivot axis between an open position and a closed position;
a float arm having a first end connected to the closure member, and a second end, said float arm extending downwardly form the closure member and then laterally from the draw tube;
a buoyant float body connected to the second end of the float arm, laterally outwardly from the draw tube,
wherein liquid fuel acting on the buoyant float body will raise the buoyant float body, and in the process will swing the float arm and the closure member, moving the closure member into an open position, and a lowering of the fuel level in the tank to a predetermined level will cause the buoyant float body to drop in the tank, and in the process swing the float arm and the closure member, to move the closure member towards a draw tube closing position;
wherein the draw tube has an upwardly directed first valve seat on a first side of the pivot axis, and said valve closure member includes a first side part projecting laterally from the pivot axis, generally towards the first valve seat, said first side part having an outer lower edge surface which contacts the first valve seat when the valve closure member is in a closed position, and said draw tube having a downwardly directed second valve seat on the side of the pivot axis opposite the first valve seat, and said valve closure member includes a second side part which extends laterally outwardly from the pivot axis generally toward the second valve seat, aid second side part having an upper outer edge, surface which contacts the second valve seat when the valve closure member is in tis closed position; and wherein said float arm is connected to the second side part of the valve closure member.

18. A fuel system according to claim 17, wherein each draw tue includes a tubular mounting member at its lower end and the first and second valve seats are on aid mounting member, and said valve closure member is pivotally connected to said mounting member.

19. A fuel system according to claim 18, wherein aid mounting member includes a pair of diametrically opposed, aligned openings, and said closure member includes a pair of trunnions which are collinear with the pivot axis, said trunnions extending radially outwardly from diametrically opposite sides of the valve closure member, into said openings in the mounting member.

* * * * *

UNITED STATES PATENT AND TRADEMARK OFFICE
CERTIFICATE OF CORRECTION

PATENT NO. : 5,168,891

DATED : December 8, 1992

INVENTOR(S) : Charles J. Green and John M. Morris

It is certified that error appears in the above-identified patent and that said Letters Patent is hereby corrected as shown below:

Column 1, line 6, "Commercial" should be -- commercial --.
Column 4, line 22, "tube 34" should be -- tube 14 --.
Column 6, line 18, "plane" should be -- place --.
Column 6, line 56, "conneotion" should be -- connection --.
Claim 13, column 9, line 38, "end o" should be -- end of --; and
  in line 40, "arm pat" should be -- arm part --.
Claim 16, column 9, line 51, "fist" should be -- first --; and
  in line 66, "int" should be -- in --.
Claim 16, column 10, line 18, "enclosure" should be -- closure --.
Claim 17, column 10, line 41, after "through", insert -- the --;
  in line 42, "that" should be -- the --; and
  in line 49, "form" should be -- from --.
Claim 17, column 11, 9th line, "aid" should be -- said -- and
  delete the comma after "edge"; and in the 11th line,
  "tis" should be -- its --.

UNITED STATES PATENT AND TRADEMARK OFFICE
CERTIFICATE OF CORRECTION

PATENT NO.  : 5,168,891                    Page 2 of 2
DATED       : December 8, 1992
INVENTOR(S) : Charles J. Green, et al It is certified that error appears in the above-indentified patent and that said Letters Patent is hereby corrected as shown below:

Column 12, claim 18, line 4, "tue" should be --tube--

Column 12, claim 19, line 8, "aid" should be --said--

Signed and Sealed this

Seventh Day of December, 1993

*Attest:*

BRUCE LEHMAN

*Attesting Officer*      *Commissioner of Patents and Trademarks*